April 25, 1967 J. I. YELLOTT 3,316,413
RADIATION SENSITIVE INSTRUMENT FOR DETERMINING THE SOLAR
OPTICAL PROPERTIES OF LIGHT TRANSMITTING MATERIALS
Filed Oct. 10, 1963 2 Sheets-Sheet 1
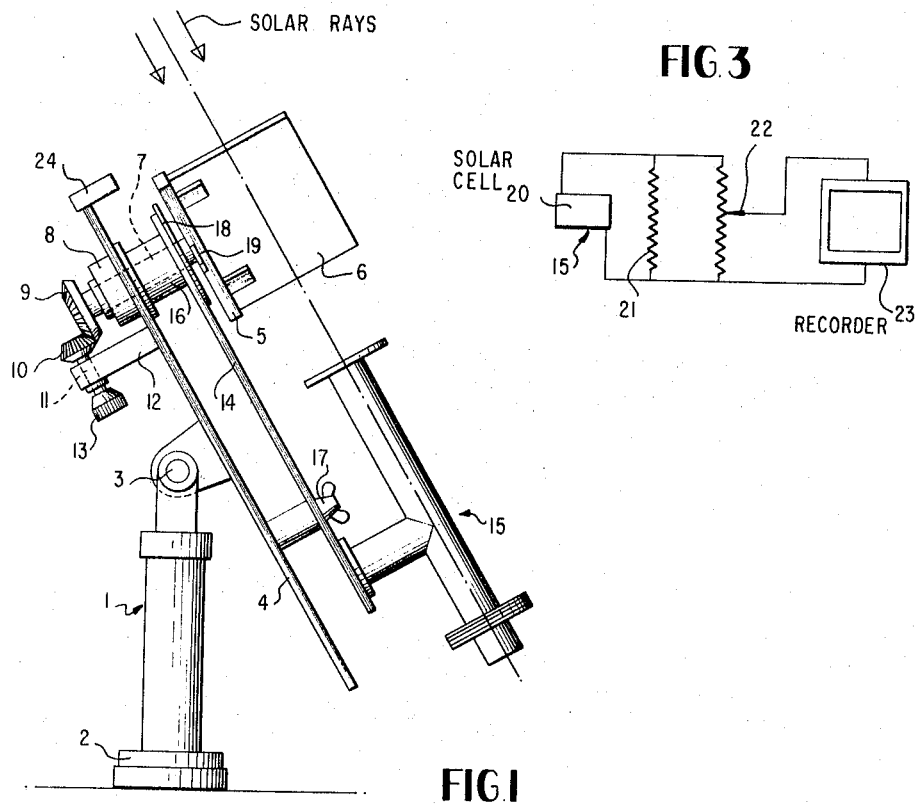
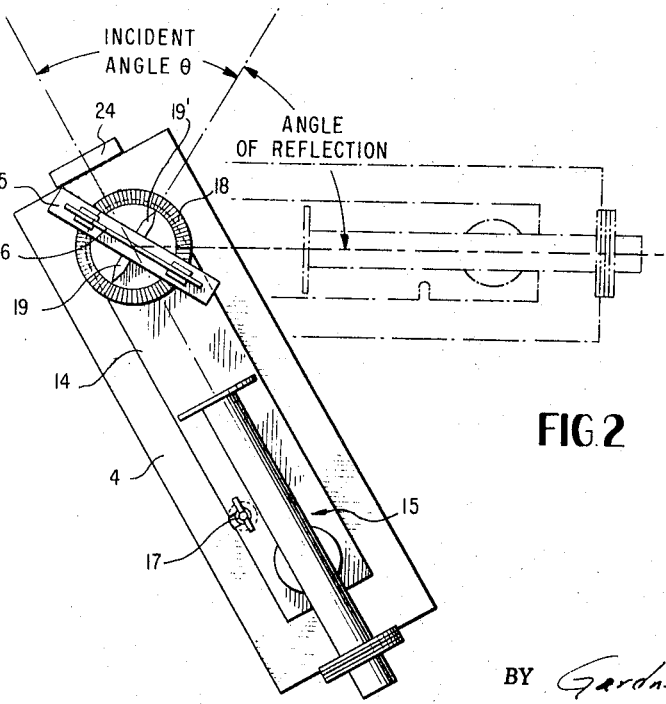
INVENTOR
JOHN I. YELLOTT
BY *Gardner J. O'Boyle*
ATTORNEY

INVENTOR
JOHN I. YELLOTT
ATTORNEY

# United States Patent Office 3,316,413
Patented Apr. 25, 1967

3,316,413
RADIATION SENSITIVE INSTRUMENT FOR DE-
TERMINING THE SOLAR OPTICAL PROPERTIES
OF LIGHT TRANSMITTING MATERIALS
John I. Yellott, Phoenix, Ariz., assignor to John Yellott
Engineering Associates, Inc., Phoenix, Ariz.
Filed Oct. 10, 1963, Ser. No. 315,269
7 Claims. (Cl. 250—234)

This invention relates to an instrument for determining the solar-optical properties of light-transmitting materials and, more particularly, to an instrument for determining the transmittance, reflectance and absorptance of solar radiation directed against materials, such as glass and plastic.

When brilliant sunshine falls upon a window, several problems arise which the architect and the air conditioning engineer must try to solve in a manner which will be acceptable both economically and esthetically. One of these problems is the control of glare and solar heat gain which, through fenestration, has assumed increasing importance during the past decade as a result of the greater use of glass in high-rise buildings and the extension of all-glass architecture into regions which encounter intense sunshine and high ambient temperature.

By applying appropriate formulae, the glare and solar heat gain characteristics of various types of glass can be predicted if the solar optical properties of the selected glass have been determined. It is well known that the sum of the three solar optical properties; namely, transmittance, reflectance, and absorptance must be unity, the equation being:

$$\tau + \rho + \alpha = 1.0$$

Therefore, when any two are known, the other can be readily found.

Heretofore, in calorimetric determinations of the solar-optical properties of glass at varying incident angles, reflectance is determined from the above equation after the other two properties have been found. While the calorimetric method has been satisfactory for the results obtained, its main disadvantage resides in the great amount of time required to obtain these results.

After considerable research and experimentation, the instrument of the present invention has been developed wherein the transmittance and reflectance of material such as glass, plastic, etc., can be expeditiously and accurately determined. Thus, when the transmittance and reflectance are known, the absorptance can be found immediately by applying the above-noted equation.

The instrument of the present invention comprises, essentially, a normal incidence pyrheliometer carried by an arm rotatably mounted on a manually adjustable sun-following mount. A rotatable sample-holder, which can vary the angle of incidence between the solar ray and the glass sample from 0° to 85°, is positioned between the sun and the pyrheliometer. By this construction and arrangement, a reading of solar radiation intensity with no glass in the holder, divided into an immediately subsequent reading with the glass in place at the desired incident angle, gives the transmittance at that particular angle. Since the pyrheliometer is mounted on an arm which enables it to rotate around the glass sample without disturbing the incident angle setting, the reflected energy is measured by simply rotating the pyrheliometer to the angle of reflection and reading the intensity of the reflected beam.

An object of the present invention is to provide an improved instrument for determining the solar optical properties of light-transmitting materials.

Another object of the invention is to provide an improved instrument for determining the solar optical properties of light-transmitting materials wherein a pyrheliometer is provided for directly measuring the transmittance and reflectance of a selected material.

Still another object of the invention is to provide an improved instrument for determining the solar optical properties of light transmitting materials wherein a material sample holder is provided which can be adjusted so that the angle of incidence between the incoming solar rays and a line normal to the sample surface can be adjusted from 0° to 85°.

Yet another object of the invention is to provide an improved instrument for determining the solar optical properties of light-transmitting materials at various incident angles wherein a pyrheliometer is provided which can be pivoted around a sample of the material without disturbing the angular relation between the sample and the incoming solar rays whereby the reflectance of the sample can be measured directly.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions which, for the purpose of explanation, have been made the subject of illustration.

In the drawings:

FIGURE 1 is a side elevational view of the instrument of the present invention;

FIGURE 2 is a top plan view of the instrument showing the pyrheliometer in phantom moved to a position for measuring the reflectance of a sample;

FIGURE 3 is a schematic drawing showing the electrical circuit employed in the instrument for measuring the solar optical properties of the material;

Figure 4A:
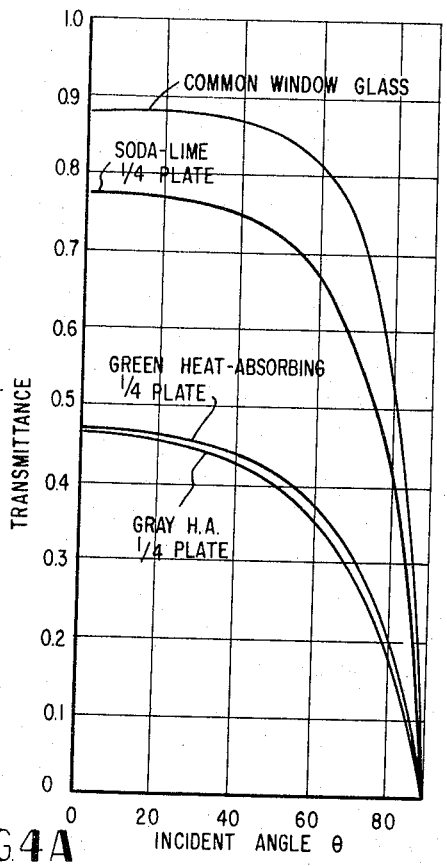
FIGURES 4A and 4B are graphs illustrating the results of actual tests conducted on various types of glass employing the instrument of the present invention.

Referring to the drawings and more particularly to FIGURES 1 and 2 thereof, the instrument of the present invention comprises a manually adjustable sun-following mount 1, having an azimuth adjustment 2 and an altitude adjustment 3. While a sun following mount of the alt-azimuth type has been illustrated it will be understood to those skilled in the art that a sun-following mount of the equatorial type could be employed equally as well so long as the instrument is able to follow the sun. A base 4, carried by the sun-following mount, is provided with a holder 5 adapted to removably receive a sample of glass, plastic or other light-transmitting material 6, the solar optical properties of which are to be determined, to be described more fully hereinafter. One end of a shaft 7 is secured to the sample holder 5, said shaft extending through the base 4 and being journalled in a bearing 8 secured to the lower surface of the base. The opposite end of the shaft is provided with a bevel gear 9 which meshes with another bevel gear 10 secured to one end of a shaft 11 supported on the base, by means of a bracket 12, the opposite end of said shaft being provided with a knob 13. Thus, it will be readily seen that by turning the knob 13, the holder 5 and its associated sample can be rotated relative to the base 4.

An arm 14 is provided for carrying a pyrheliometer 15 on one end thereof, the center line of said pyrheliometer being parallel to and directly above the center line of the arm 14. The opposite end of the arm is journaled on a bearing 16 secured to the upper surface of the base in concentric relationship with the shaft 7. Since the arm 14 is freely rotatable around the bearing 16, suitable clamping means 17 is provided between the base 4 and the arm 14, whereby the arm may be firmly positioned so that its center line is parallel to the center line of the base. By loosening the clamp, the arm and associated pyrheliometer can be swung around to the dotted line position shown in FIGURE 2.

A dial 18 graduated into 360 degrees is secured to the upper end of the arm beneath a pair of oppositely extending pointers 19, 19' secured to the center of the sample holder at right angles thereto. By the construction and arrangement of the dial and pointers, the pointer 19 is adjacent the zero degree mark on the dial when the holder 5 is positioned so that it is perpendicular to the center line of the pyrheliometer 15. When the sample holder is rotated to a position as shown in FIGURE 2, the pointer 19 is positioned adjacent another mark, for instance the sixty degree mark, which indicates the incident angle between the incoming solar rays and a line normal to the holder and associated sample.

The pyrheliometer 15 employed in the instrument of the present invention is of the type disclosed in my copending application Ser. No. 131,531, filed Aug. 15, 1961, now Patent No. 3,145,568, and can be either of the thermopile or the photovoltaic type. The electrical circuit of the pyrheliometer is shown schematically in FIGURE 3 and includes a silicon solar cell 20 connected to a load resistor 21; the output signal of the pyrheliometer is fed to a voltage-dividing potentiometer 22, the output of said potentiometer being connected to a millivolt recorder 23 adapted to give readings in percent.

In the operation of the instrument to determine the transmittance of a sample, such as glass, a reading is first made of the pyrheliometer 15 in the sun-following position; that is, when the center line of the pyrheliometer is parallel to the center line of the arm, and with no glass sample in the holder 5. A second reading is then made with a sample 6 mounted in the holder so that it is normal to the incoming solar rays, the incident angle therefore being zero, and the pyrheliometer remaining in the sun-following position. The ratio of the pyrheliometer reading with the glass sample in place to the reading with no glass is the transmittance of the glass. This ratio is recorded automatically by feeding the output signal of the pyrheliometer 15 through the potentiometer 22 and into the millivolt recorder 23. Thus to set the instrument, the pyrheliometer is trained on the sun with no glass sample in the holder and the potentiometer is adjusted so that the recorder reads 100%. When the glass is inserted into the holder, the signal from the pyrheliometer is immediately reduced and the second reading on the recorder gives the transmittance directly.

Since the angle of reflection is always equal to the incident angle, it is not possible to measuse the reflectance at zero angle of incidence because it would be necessary to rotate the arm and associated pyrheliometer 180° from the transmittance-measuring position; this would therefore intercept the incoming solar rays. To determine the transmittance and reflectance of the glass at angles other than zero, the sample 6 is rotated through a desired number of degrees by turning the knob 13 until the desired position is indicated on the dial 18 by the pointer 19. The recorder 23 will then show the percent of transmittance of the glass at the selected incident angle, that is, the angle between the incoming solar rays and a line normal to the glass surface. To measure the reflectance of the glass sample at the selected incident angle, the clamping means 17 is loosened and the arm 14 carrying the pyrheliometer 15 is rotated around to the front of the glass sample 6 so that the center line of the pyrheliometer is aligned with the reflected rays of the sun, the angle between the center line of the pyrheliometer at this position and a line normal to the glass surface being the angle of reflection which is equal to the angle of incidence. The recorder 23 will immediately indicate the percent of reflectance at the selected incident angle. After this has been recorded, the arm 14 is returned to its original position and secured thereat by the clamp 17. The glass sample 6 can then be set at another incident angle whereby the transmittance of the sample at the new angle is recorded and the reflectance measured by swinging the arm 14 around to the new angle of reflectance as described hereinabove. By changing the angle of the glass sample at intervals of 5 or 10 degrees, the transmittance and reflectance characteristics of the glass sample being tested can be determined over the complete range of incident angles between 0° and 85°.

It has been found that, if the readings are being made within approximately two hours of solar noon, either earlier or later, the intensity of the solar rays rarely changes when the sky is clear, and ordinarily the entire range of incident angles can be covered before it becomes necessary to remove the glass sample and make a new 100% setting of the potentiometer. However, it is necessary to make frequent checks of the intensity of the incident solar rays when a thermopile-type pyrheliometer is used because the time lag of this type of pyrheliometer is such that approximately thirty seconds must be allowed for the instrument to reach an equilibrium position in either the transmittance position or the reflectance position. Rather than repeatedly removing the sample from the holder to determine whether or not the potentiometer needs to be reset, a monitoring pyrheliometer 24 can be mounted on the upper edge of the base 4 and connected to a second recorder (not shown). Thus, the constancy of the sunshine intensity may be determined by observing the trace of the second recorder and if the monitoring pyrheliometer indicates that the total intensity of the incoming solar rays is constant, there is no need to re-set the potentiometer 22 during a series of readings.

From the above description, it will be seen that the transmittance and reflectance of a transparent material can be determined over a wide range of incident angles. It is well known that sum of the three solar optical properties; namely transmittance, reflectance and absorptance, must unity, the equation being:

$$\tau + \rho + \alpha = 1.0$$

Thus, the absorptance at each incident angle may be determined by subtracting the sum of the transmittance and reflectance at each angle from unity, the equation being:

$$\alpha = 1 - (\tau + \rho)$$

Figure 4B:
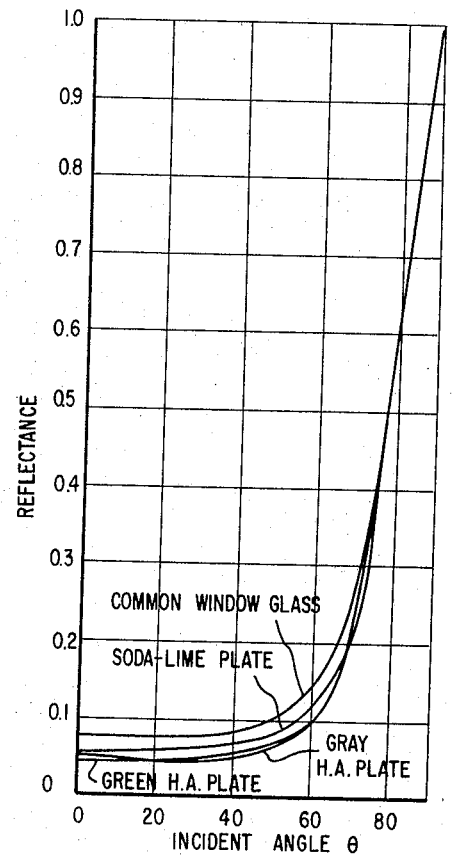

Typical data obtained with the instrument of the present invention is illustrated in FIGURES 4A and 4B showing the results of tests performed on common window glass, soda-lime ¼ plate glass, green heat-absorbing ¼ plate glass and gray heat-absorbing ¼ plate glass. Taking common window glass as an example, it will be seen that at an incident angle of 40° the transmittance of the glass is 0.87 and the reflectance of the glass at the same angle of incidence is 0.09. Therefore, the absorptance of the glass can be determined by subtracting the sum of the transmittance and reflectance from unity; viz:

$$\alpha = 1 - (.87 + .09) = .04$$

Figure 5:
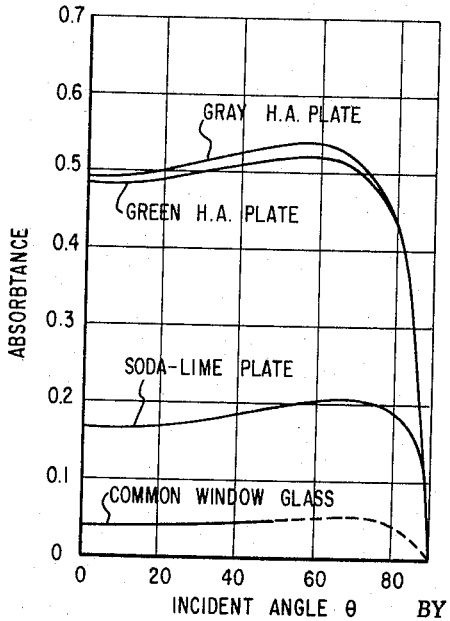
FIGURE 5 is a graph illustrating the absorptance values of various types of glass obtained from the transmittance and reflectance values shown in FIGURES 4A and 4B, respectively.

The absorptance of the various types of glass at incident angles from 0° to 85° is graphically illustrated in FIGURE 5.

While I have shown and described the preferred embodiment of my invention, I wish it to be understod that I do not confine myself to the precise details of construction herein set forth by way of illustration, as it is apparent that many changes and variations may be made therein, by those skilled in the art, without departing from the spirit of the invention or exceeding the scope of the appended claims.

I claim:
1. An instrument of the character described for determining the solar optical properties of light-transmitting materials comprising, a manually adjustable sun-following mount, a holder adapted to carry a sample of light-transmitting material rotatably mounted on said sun-following mount, adjustment means carried by the sun-following mount operatively connected to said holder for rotating the holder relative to the sun-following mount, whereby the incident angle between the incoming solar rays and a line normal to a sample of material in the holder can be varied, pyrheliometer means comprising a device sensitive to solar radiation carried by said sun-following mount adapted to measure the transmittance and reflectance of a sample in the holder, and means to pivotally mount said pyrheliometer on said sun-following mount, whereby the reflectance of a sample can be measured directly by pivoting the pyrheliometer around the sample to the angle of reflection without disturbing the angular relation between the sample and the incoming solar rays.

2. An instrument of the character described for determining the solar optical properties of light transmitting materials comprising, a manually adjustable sun-following mount having a base, a material sample holder rotatably mounted on said base, adjustment means carried by said base operatively connected to said holder for rotating the holder relative to said base to thereby vary the angle of incidence of a sample in the holder, an arm mounted on said base, a pyrheliometer means comprising a device sensitive to solar radiation secured to one end of said arm for measuring the transmittance and reflectance of a sample in the holder, and means to pivotally mount said arm on the base whereby the reflectance of a sample of material in the holder can be measured directly by pivoting the arm and associated pyrheliometer around the sample to the angle of reflection without disturbing the angular relation between the sample and the incoming solar rays.

3. An instrument for determining the solar optical properties of light-transmitting materials according to claim 2, wherein the pyrheliometer comprises a silicon solar cell having a load resistor connected through a voltage-dividing potentiometer to a millivolt recorder, whereby the transmittance and reflectance of a sample of material in the holder can be recorded by feeding the output signal of the pyrheliometer through the potentiometer into the millivolt recorder.

4. An instrument for determining the solar optical properties of light-transmitting materials according to claim 2, wherein clamp means is provided between the base and the arm for maintaining the arm and associated pyrheliometer in alignment with the center line of said base when the transmittance of a sample in the holder is being determined.

5. An instrument for determining the solar optical properties of light-transmitting materials according to claim 2, wherein a monitoring pyrheliometer including a recorder is mounted on the base whereby the constancy of the sunshine intensity can be observed.

6. An instrument of the character described for measuring the solar optical properties of light-transmitting materials comprising, a manually adjustable sun-following mount having a base, a holder adapted to carry a sample of the material to be measured, a shaft journalled in said base, said holder being connected to one end of said shaft, adjustment means connected to the opposite end of said shaft, whereby upon actuation of said adjustment means the shaft is rotated to thereby turn the holder relative to the base, a bearing secured to the base in concentric relationship with said shaft, an arm positioned above said base, one end of said arm being journalled on said bearing, and pyrheliometer means comprising a device sensitive to solar radiation for measuring the transmittance and reflectance of a sample in the holder secured to the opposite end of said arm, whereby the transmittance of the sample at a selected incident angle can be measured when the arm and associated pyrheliometer are aligned with the base, and the reflectance of the sample can be measured by swinging the arm to the angle of reflectance without disturbing the angular relation between the sample and the incoming solar rays.

7. An instrument of the character described for measuring the solar optical properties of light-transmitting materials according to claim 6, wherein a dial graduated into 360° is mounted on the arm beneath the holder, and a pointer secured to said holder in proximity to said dial, whereby upon rotation of said holder the angle of incidence is thereby indicated.

References Cited by the Examiner

UNITED STATES PATENTS

| | | | |
|---|---|---|---|
| 1,756,785 | 4/1930 | Gallasch | 88—14 |
| 2,155,402 | 4/1939 | Clark | 33—61 |
| 2,406,166 | 8/1946 | Scott | 250—226 X |
| 2,773,412 | 12/1956 | Huck | 88—14 |
| 2,902,898 | 9/1959 | Kops | 88—14 |
| 3,012,465 | 12/1961 | Goldberg | 250—216 X |

RALPH G. NILSON, *Primary Examiner.*

WALTER STOLWEIN, *Examiner.*